US010326655B1

(12) United States Patent
Sait et al.

(10) Patent No.: US 10,326,655 B1
(45) Date of Patent: Jun. 18, 2019

(54) INFRASTRUCTURE REPLICATION

(71) Applicant: Amazon Technologies, Inc., Seattle, WA (US)

(72) Inventors: Abdul Sathar Sait, Redmond, WA (US); Sabareesan Radhakrishnan, Fife, WA (US); Karthikeyan Krishnan, Sammamish, WA (US); Steven Reynolds Jones, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 395 days.

(21) Appl. No.: 14/727,727

(22) Filed: Jun. 1, 2015

(51) Int. Cl.
| *G06F 16/28* | (2019.01) |
| *H04L 12/24* | (2006.01) |
| *H04L 12/26* | (2006.01) |
| *H04L 29/08* | (2006.01) |

(52) U.S. Cl.
CPC ........ *H04L 41/0846* (2013.01); *G06F 16/283* (2019.01); *H04L 41/046* (2013.01); *H04L 43/12* (2013.01); *H04L 67/1095* (2013.01)

(58) Field of Classification Search
CPC .. H04L 41/0846; H04L 67/1095; H04L 43/12
See application file for complete search history.

(56) References Cited

U.S. PATENT DOCUMENTS

| 6,123,737 A * | 9/2000 | Sadowsky | G06F 8/65 717/173 |
| 2004/0221003 A1* | 11/2004 | Steele | H04L 29/06 709/203 |
| 2006/0123104 A1* | 6/2006 | Spinelli | H04L 29/06 709/223 |
| 2008/0040455 A1* | 2/2008 | MacLeod | G06F 8/61 709/220 |
| 2008/0082630 A1* | 4/2008 | Molotchko | G06F 11/2097 709/218 |
| 2013/0262390 A1* | 10/2013 | Kumarasamy | H04L 41/08 707/649 |

\* cited by examiner

*Primary Examiner* — John M Macilwinen
(74) *Attorney, Agent, or Firm* — Thorpe North & Western, LLP

(57) ABSTRACT

Technology for capturing a configuration of an infrastructure to enable replication of the infrastructure is provided. In one example, a layout agent may be provided for deployment to an infrastructure, including a server, together with instructions for the layout agent to capture server layout data for the server and to communicate the server layout data to a replication application. The server layout data for the server may be received at the replication application. A system model for the infrastructure may be generated based on the server layout data from the layout agent. The replication of the infrastructure as a replicated infrastructure may be initiated based on the system model.

21 Claims, 7 Drawing Sheets

INFRASTRUCTURE REPLICATION

BACKGROUND

Applications and computing services are often made available over the Internet or other computer networks. Content providers, application providers, and/or computing service providers often utilize remote computing services to providing access to electronic resources, such as web services. Electronic resources may include processing services, memory services, storage services, networking services and generally any computing services supported by a hardware substrate that is hosted in a computing service environment. Often the hardware and/or software used to support the desired services are dynamically scalable to meet the changing load for the services at any given time. Users, for example, may rent, lease, or otherwise pay for access to networked computing resources and computing services, and thus reduce the burden of providing local hardware and/or software for computing services, as compared with implementations without network accessible computing services.

As an example of increased utilization of network accessible computing resources provided via a data center, virtualization technologies can allow a single physical computing machine to host one or more instances of virtual machines that appear and operate as independent machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis. Each virtual machine may execute one or more applications, such as a web server, video encoder, load balancer, or database, among many other possibilities.

DETAILED DESCRIPTION

Technology for capturing a configuration of an infrastructure to enable replication of the infrastructure is provided. In one example, a layout agent may be provided for deployment to an infrastructure on a server or another computing device together with instructions for the layout agent to capture server layout data for the server and to communicate the server layout data to a replication application. The server layout data for the server may be received at the replication application. A system model for the infrastructure may be generated at the replication application based on server layout data from the layout agent. The re-creation of the infrastructure may be initiated based on the system model to generate a re-created infrastructure. Also, the operational data, used by the server in the infrastructure, may be replicated for servers re-creating the infrastructure.

In a more specific example, a layout agent may be deployed to an infrastructure including a plurality of servers. The layout agent may have instructions to capture server layout and configuration data and to communicate the server layout and configuration data to a replication application. For example, server layout and configuration data may include one or more Internet Protocol (IP) addresses of a server, a number of central processing unit (CPU) cores of the server, an amount of memory available to the server, network configurations for the server, applications executing on the server, and data storage accessed by the server, or any of a variety of other types of layout and configuration data for the server. The replication application may receive server layout and configuration data for the plurality of servers in the infrastructure. The replication application may generate a system model for the infrastructure based on the server layout and configuration data from layout agents at the plurality of servers. The infrastructure may be re-created or re-generated in a second portion of the service provider environment as a re-created infrastructure based on the system model. The re-creation of the infrastructure may be initiated by the replication application. The replication application may also initiate importing of operational data used by the plurality of servers into the re-created infrastructure.

Figure 1:
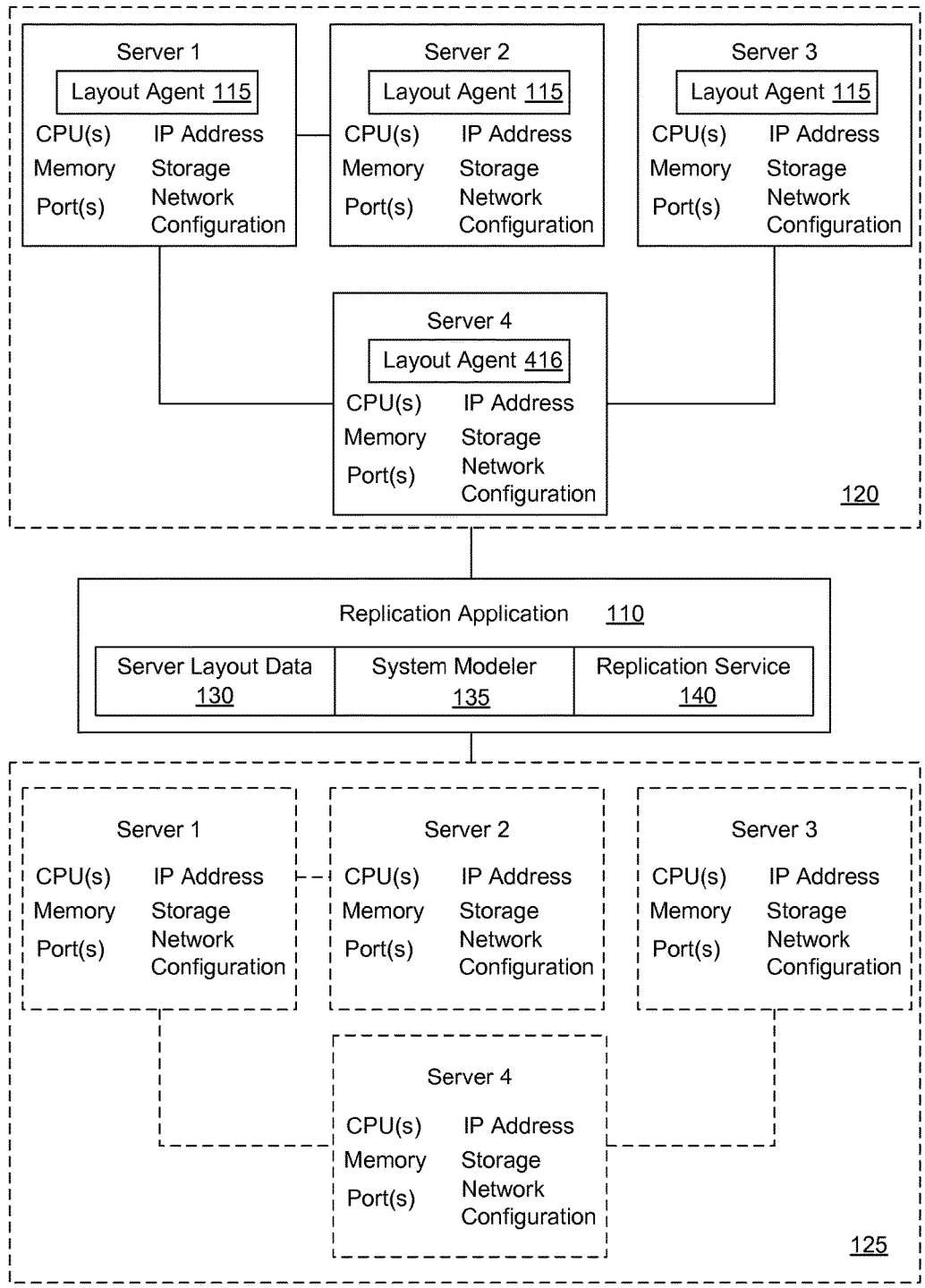
FIG. 1 is a schematic overview of a system for capturing a configuration of an infrastructure to enable replication of the infrastructure in accordance with an example of the present technology.

Reference will now be made to FIG. 1, which is a diagram illustrating a high level example of a system for replicating infrastructure. Cloning an environment of multiple instances, applications and the external dependencies (e.g., infrastructure, collectively) is useful for testing and disaster recovery purposes. Since the performance and stability of the production system may depend on multiple factors (e.g., underlying hardware, and even the particular selection of IP (Internet Protocol) addresses and routing paths), being able to clone an environment down to the level of using the same IP addresses and accounting for the particular hardware or virtual machine dependencies (such as hardware level bugs (known or unknown) and hardware tied licensing schemes, block storage attached to a server, network Internet Protocol (IP) addresses used in the infrastructure, open server ports, security rules etc.) provides customer value. At least a portion of the information used for replicating the environment may be obtained using agents, as will be described. Another portion of the information used for replicating the environment may be repository data available at a control plane (hardware or software) of the infrastructure. For example, the control plane data may include a network configuration for network management, subnets, routers, gateways, switching rules, traffic shaping rules, prioritization/de-prioritization rules, packet blocking, etc. The present technology may enable replication of virtualized infrastructure, including the discovery of particular external dependencies (load balancers, firewalls, etc.) and their configurations using the agents in combination with the repository data from the control plane.

Replicating computing instances in a shared service provider environment may be used, for example, to facilitate troubleshooting of computing system failures or computing anomalies. A cloned computing instance may be created from an original computing instance. The machine image of the original computing instance is used to create the clone, resulting in a copy of the original computing instance as it existed at boot time. The state of the cloned computing instance may then modified to reflect the original computing instance by applying a snapshot of the execution environment of the original computing instance as the computing instance existed at a particular point in time after boot time. The state of the cloned computing instance may then be moved again by applying the same inputs seen by the original computing instance during a particular period of time to the cloned computing instance. These inputs may include the state or configurations of a virtual block device (e.g., read, write, etc.), network configurations, and/or any other suitable types of state inputs.

Replicating a system infrastructure may be useful, for example, for recovering from system crashes. A system crash is a condition in which a computer or a program, either an application or part of the operating system, ceases to function properly, often resulting in the system being unusable. When computing systems undergo crashes, the user of the machine may have the option of rebooting the computing instances and services, and/or restarting the applications that were being executed. However, in doing so, the user may lose information about events that led up to the crash, thus hampering the ability to determine what caused the crash. The user may have another option, which is keeping the virtual machine offline or otherwise out of service such that events that led up to the crash can be examined. However, keeping the computing system out of service can have a negative impact on the user's productivity. The present technology may enable simpler and less expensive replication of infrastructure than is conventionally available and may reduce or avoid the negative impact of system crashes or the like. Other example use cases for the present technology are also described herein.

FIG. 1 illustrates a block diagram of an example implementation of a system for replicating an infrastructure including servers having hardware definitions, hardware dependencies, configurations, etc. The servers may be computing instances or computing resources available as a service in a service provider environment. Computing services provided through the service provider environment may enable access to a hardware substrate that is underlying the computing resources. Some example networked computing services may include compute services, storage services, networking services, I/O services, and so forth. For example, a computing instance or server may be executing on a hypervisor, which in turn executes on a hardware substrate that is physical server hardware.

As used herein "virtual computing" may refer to the use of computing services (hardware and/or software) which may be available at a remote location that is separate from the users of the computing services and the virtual computing services may be accessible over a network, such as the Internet. Users may be able to buy these computing services (including storage, computing power, networking and applications) as a utility on demand and sometimes by the hour. Use of virtual computing services can provide a number of advantages including scalability, cost advantages and/or the ability to adapt rapidly to changing computing service needs.

The service provider environment may be a multi-tenant service provider environment, such as a "cloud" environment for example. The service provider environment may include an execution environment or a computing instance that includes an application software stack for the user's application(s) together with one or more infrastructure services for executing the user's application on the compute service. The virtualization environment or computing instance may include a user-selectable operating system (e.g., Linux, Windows, etc.), application server (e.g., Apache Tomcat), etc. The virtualization environment can be configured to be accessed at a specific URL. The infrastructure services can include, but are not limited to, a load balancer to distribute workload across the requested computing services, a load scaler to scale computing services in response to load or demand variations, a firewall or other service to control access to the computing services, a monitoring interface that permits the user to monitor execution of applications, data storage resources (e.g., scalable volume block storage), and so forth. In some embodiments, the user may be able to select one or more services that may be accessed in the virtualization infrastructure. For example, the user may be able to select from a plurality of database models (e.g., a relational database, SQL database, NoSQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of the computing service provider.

The service provider environment may be capable of delivery of computing and storage capacity, as well as other computing services, as a service to a community of end recipients. In an example implementation, the service provider environment may be established for an organization (i.e., a "customer") by or on behalf of the organization. That is, the service provider may offer a "virtual private cloud environment."

In one example, a service provider environment may include any number of server computers for a compute service. The server computers may provide computing services for executing software or computing instances, which may also be referred to as virtual machines or computing instances. A virtual machine may generally be an instance of a software implementation of a machine (i.e. a computer) that executes computer code like a physical machine.

An application may be software or a computer program, such as may be designed to help a person perform an activity. An application may manipulate text, numbers, graphics, etc. Some application packages offer focused computing functions by focusing on a single task, such as word processing. Other application packages, such as integrated software packages, may offer less focus but may include multiple applications to perform multiple tasks. User-written software applications tailor systems to meet a user's specific needs. User-written software may include custom numerical processing, internet services, web servers, scientific simulations, graphics rendering and animation processes, email filters and so forth. Applications executable on the local device and/or in the service provider environment may be any suitable type or form or application as may be appreciated.

A replication application 110 may be used by an administrator to manage replication of the infrastructure including any servers. The replication application 110 may provide a graphical user interface (GUI) for interfacing with the replication application 110 to perform replication tasks. The replication application 110 may enable the administrator to view a status of replication of an infrastructure, to view or access replicated infrastructure, to initiate replication and so forth.

The replication application 110 may identify and maintain a tie or link to servers in the infrastructure. Additionally, the replication application 110 may deploy layout agents 115 to the servers and may identify and maintain a tie or link (e.g. a communication channel) to the layout agents 115 and/or may setup a tie or link between layout agents 115 and the servers with which the layout agents are associated. The replication application 110 may provide a layout agent 115 that may be deployed to each of the servers in the infrastructure to capture server layout data for each of the servers. The server layout data may include the identification of underlying hardware or hardware dependencies, configurations of components of the server and so forth. Some example server layout data 130 illustrated in the servers and stored for the replication application 110 includes identification of the CPU(s), memory, port(s), IP address(es), storage, network configuration, applications, and so forth of the server(s). Server layout data 130 may include identification of one or more computing instance types, storage volumes, elastic load balancers, relational database instances, routers, proxy servers or the like.

The replication application 110 may provide the layout agent 115 for measuring, collecting, capturing or otherwise acquiring server layout and configuration data. The layout agent 115 may be integrated into an application on the server. The layout agent 115 may be an SDK (software development kit) or an API (application programming interface), a daemon, instrumentation or other technology for collecting the metrics. The layout agent 115 or any other agent described herein may be a program that performs information gathering or processing tasks, optionally as a background process. The layout agent may be a computer program that performs various actions continuously and autonomously on behalf of an individual or an organization or on behalf of another software program. The layout agent may be a persistent, goal-oriented program that reacts to its environment and runs without continuous direct supervision to perform a designated function. The layout agent may have a UI (user interface). In addition, the layout agent may activate and run itself without input from or interaction with a human user, and the layout agent may also initiate, oversee, and terminate other programs or agents.

The layout agent 115 may provide or access an API (application programming interface) in one or more various programming languages to enable users to write code executing in a designated location against APIs exposed in an SDK, such as Java .NET, IOS, Ruby, etc. The SDK may transform or translate requests in a programming language to HTTP (hypertext transfer protocol) requests for the web service APIs of the service provider that are supported by the SDK. In a specific example where the layout agent 115 is integrated with the SDK, the SDK itself may be used to collect server layout data about the server, and/or the application the SDK is integrated with and so forth. The layout agent 115 may make web service API requests via the SDK. In an example, the layout agent (via the SDK) may be in communication with the replication application 110 in the service provider environment. For example, the layout agent 115 may send data to and optionally receive data from the service provider environment.

A simplified example application of the present technology will be described. Enterprises may desire to duplicate or replicate an entire environment or infrastructure, including structural pieces, such as hardware and hardware dependencies. For example, a system may include five web servers, five application servers, three batch servers, two reporting servers, a clustered database, edge firewalls, firewalls between applications and database servers and so forth. Each infrastructural piece may have an IP address, APL (named after the book A Programming Language) rules or the like.

If the enterprise maintains a single infrastructure or computing environment, the environment may be a production environment 120. Tests, troubleshooting, etc. typically are not run on production environments due to the potential downtime for customers caused by the tests, troubleshooting or the like. The enterprise may thus desire to have an environment exactly like the production environment 120 to run tests and to discover solutions to problems. Use of an environment without the exact same number of servers, without the same configuration, without the same dependencies, same addresses, or the like may not be useful for testing, backup or other purposes. For example, a particular problem may occur on February $27^{th}$ if five application servers are running using specific IP addresses. This problem or bug may not arise in a recreated infrastructure if the infrastructure is recreated with a different IP address, a different number of servers or some other significant difference from the production environment 120. As another example, if the enterprise wishes to begin use of a new payroll system or other system in a production environment 120, the enterprise may wish to test the new system before bringing the new system into the production environment 120. Without testing in an identical environment as the production environment 120, the issues that arise or fail to arise may differ from what arises or fails to arise in the production environment 120.

In the past, replication of infrastructure has been performed primarily manually and painstakingly. The replicated infrastructure cannot be repurposed for something else or it will differ from the production environment 120 and not be useful for troubleshooting, testing, backup or the like. Enterprises may tie up a lot of money when replicating an environment to be exactly like the production environment 120. Oftentimes, there may be a single replicated environment 125 and as a result, multiple tests cannot be performed at a same time on the environment. For example, if the enterprise wishes to do performance testing, batch testing or debugging, these must be performed sequentially. With the advent of virtualization technologies, some aspects of an infrastructure may be imported into or exported from an environment, such as a firewall configuration. New servers may be created by spinning up computing instances, and applications may be installed thereon. However, the process for replicating an environment is still largely manual and time consuming.

For large corporations, there may be dozens of environments to replicate. The present technology provides an automated way to create clones or replicated infrastructure in an environment-agnostic way. In other words, the present technology may function whether the underlying system is an Oracle, SAP, Microsoft, or other system. The layout agents of FIG. 1 may be used to create a blueprint or system model of an entire environment using a system modeler 135. The layout agents 115 may discover and report the software, IP addresses of nodes, firewall rules, data storage locations, and so forth for the servers in the environment in order to recreate or replicate the environment. For example, a production environment 120, whether maintained by a service provider in a service provider environment or whether privately hosted, may be replicated in a service provider environment using the same hardware, dependencies, software, IP addresses and the like as are used in the production environment 120. In some examples, the production environment 120 and the replicated environment 125 may both be available or running in the service provider environment. The layout agents 115 may read or discover the server layout and configuration data useful to create an exact blueprint or system model of the production environment 120, which may be used to create the same instances, using the same machine images, IP addresses, etc. on a new VPC (Virtual Private Cloud).

The replicated environment 125 may be created with little to no human intervention in a short time frame by a replication service 140. The replicated environment 125 may be replicated one or more additional times for additional simultaneous testing purposes. In one example, the present technology may be used for disaster recovery testing. A disaster recovery environment is preferably mirrored constantly with the production environment 120. Many enterprises test a disaster recovery environment periodically, such as every quarter, every six months, every year, or the like. Enterprises may desire to test the disaster recovery environment to ensure the disaster recovery environment is actually usable if something goes wrong with the production environment 120. However, if the enterprise starts testing on the disaster recovery environment, and the testing breaks the replication of the production environment, then the disaster recovery environment may be unavailable for disaster recovery purposes until the disaster recovery environment and production environment are again synchronized. A test may take 6 to 12 hours for example. If something goes wrong with the production environment during this time, the disaster recovery environment data may be up to 12 hours different from the production environment, which is disadvantageous for recovery purposes. The present technology may be used to clone the disaster recovery environment to enable testing on the clone while letting the real disaster recovery environment continue replication and synchronization with the production environment.

The present technology may be useful across service provider environments. When the present technology is used to replicate a production or other environment within a service provider environment to a duplicate infrastructure within the same service provider environment, the layout agents may forgo querying the server instances for data such as IP addresses or the like and may instead retrieve such data through logs, monitoring services or the like already available to the service provider environment. When cloning an environment from an external service provider environment or other environment, such as a private computing environment, the layout agents may interrogate or query the active server instance to which they are deployed to discover at least a portion of the server layout data used for replication. Layout agents may be deployed on each instance or each server. The layout agents may be small applications that run and capture information from a server to lay out a blueprint or system model when combined with information from other layout agents.

For example, for a compute instance, there may be a compute instance type, an IP address, a number of CPU cores, an amount of memory, networked storage, local storage, remote storage, block storage, network configuration, bandwidth of network between storage and compute instance, APL (a programming language) rules in the virtual private network for the subnet, security group, etc. that may be data captured by the layout agent. The layout agent may run or execute within the computing instance to find this layout data. The layout agent may push data into a local, networked, or remote storage bucket on an accessible storage service, for example, which may be used to collect layout data from a plurality of layout agents. The precise location may be less significant than that the layout data collected by the layout agents is stored in a location that is accessible by a system modeler 135 of the replication application 110 to put the server layout data together into the system model. Once data is captured and stored by the layout agent(s), the layout agent(s) may send a message to the replication application 110 or elsewhere to indicate that the task is complete. The layout agent may terminate or exit when the task is complete. In one example, the layout agent may remain dormant, or be suspended, on the server to await a potential future instruction to again capture the server layout data.

Deployment of a layout agent 115 may be performed manually. If security and communication privileges for the servers are available to the replication application 110, the replication application 110 may deploy the layout agent 115 automatically and remotely to the servers. A layout agent 115 may be deployed to each server within an infrastructure environment.

The replication application 110 may use a push process to push layout or other agents to the servers. Agents may run independently in each server, capture information, and push the information to the replication application 110 to be modeled in a system model by the system modeler 135. Another service, such as a replication service may run in the replication application, which may be run on one or more management servers, to use the system model and recreate the infrastructure exactly as the infrastructure currently exists. The replication application 110, system modeler 135, replication service 140, etc. may represent one or more applications or services which may execute on one or more servers. While illustrated in a particular relationship and configuration in FIG. 1, any other suitable relationship or configuration for these components may also be utilized.

The present technology may be utilized on physical hardware rather than in a virtualized computing environment. When an environment to be replicated does not have internet access, the layout agents may request access to a common local or networked storage location and may write data to one or more text files or other suitable file types. The text file may then be uploaded to where the clone of the infrastructure will be created.

The present technology may clone hardware dependencies, licensing schemes, architectures, bugs, etc., while cloning from one environment in a service provider environment to another also in the service provider environment. The present technology may match an underlying hardware substrate device and instance manager (e.g., hypervisor) with each server instance. In addition, licensing for software or the like on a computing instance may be tied to a number of cores, or the like for a computing instance, and the present technology may thus select a same computing instance type for replication as is used in the environment being replicated.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware, including: physical hardware storage resources or virtual storage resources, hardware data communications (i.e., networking) resources, I/O hardware and other types of computing resources.

The systems of FIG. 1 may be implemented across one or more computing devices, which may be connected via a network. For example, a local device or local resources may host various engines and/or modules and such modules may be executable by a processor of the local device. The local device may be implemented as a plurality of computing nodes, each of which comprises at least one processor and a memory, where the computing nodes are configured to collectively implement the modules, data stores and so forth.

A server as described herein may be a computing instance, a computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the local device or networked computing resources according to various implementations. Also, various data may be stored in a data store that is accessible to the local device or networked computing resources. The data store may be representative of a plurality of data stores as may be appreciated. The data stored in the data store, for example, may be associated with the operation of the various applications and/or functional entities described. The components executed on the local device or networked computing resources may include any of a variety of applications, services, processes, systems, engines or functionality not discussed in detail herein.

Services provided through the service provider environment, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Figure 2:
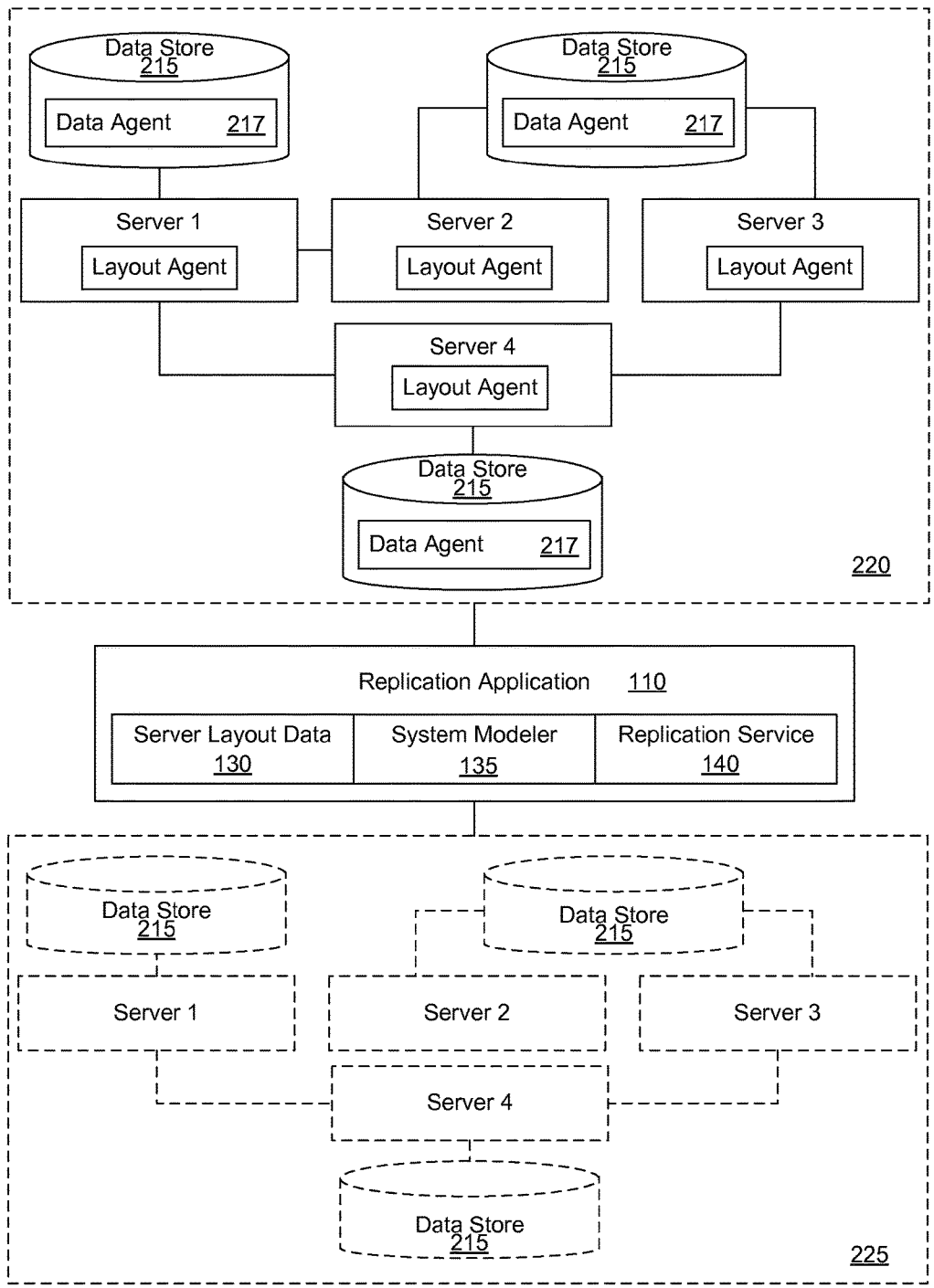
FIG. 2 is a schematic overview of a system for capturing a configuration of an infrastructure and the operational data used by the infrastructure to enable replication of the infrastructure in accordance with an example of the present technology.

Referring to FIG. 2, a system is illustrated for capturing data for replication of an environment or infrastructure and for replicating the environment. In this example, in addition to simply replicating server layout, the present technology is also used for replicating production or operational data used by the servers, or rather applications executing on the servers. While the layout agents may be used to collect data for replicating the infrastructure, data agents 217 may be stored as images to be deployed either to data stores 215, as illustrated, or to servers associated with data stores to replicate the operational data stored on the data stores 215 to make the operational data for the production environment 220 available to the replicated environment 225. For example, the replication service may create machine images of existing servers to instantiate new servers in the clone or replicated environment 225. The data agents 217 may capture snapshots of the data in the data stores to create volumes of snapshots for the replicated environment. In other words, the data agents 217 may recreate the operational data and brings the operational data into the replicated environment 225. The operational data may be cloned or replicated at a specific point of time. The operational data may be continually replicated or synchronized, or may be replicated to represent the selected, specific point in time. In other words, the replicated operational data may be a clone of the operational data available to the production environment 220 at the time of the replication. The operational data may thus not necessarily be the same as the operational data presently available to the production environment 220.

In some examples, the data set to be replicated may be too large for capture in a single snapshot. In this example, the data agents may continually run to continuously copy any changes to replicate the changing operational data as additional snapshots are captured. In one example, a snapshot of the data storage may be captured periodically, such as every 1, 5, 10, 15, 30, 60, etc. minutes. For any particular periodic snapshot, rather than capturing an entirety of the data, the periodic snapshots may simply capture the data updated since the last snapshot (e.g., 15 minutes). This may reduce the amount of data to be captured at any one time. In other words, the operational data may be incrementally captured or synchronized and made available to the replicated environment.

When the computing environment being replicated is not in the service provider environment, the source node(s) may be captured as images and brought into the service provider environment to run in the service provider environment. Data stores may be captured separate from the image of the source node(s). Cloning data stores within the service provider environment may be faster and easier than replicating data storage external to the service provider environment due to virtualization, but the present technology may similarly use the data agents to replicate external data storage to the service provider environment. The process used by this technology may be somewhat computing intensive, but may be performed significantly faster than conventional manual cloning, which may take up to several weeks. Where a large amount of data is involved, data in the external data storage may be incrementally copied to allow for time to move the data to the service provider environment. In contrast, synchronization of data within the service provider environment may more easily be performed in single snapshots or without the delays that may be incurred for the incremental copying of the external data storage.

Figure 3:
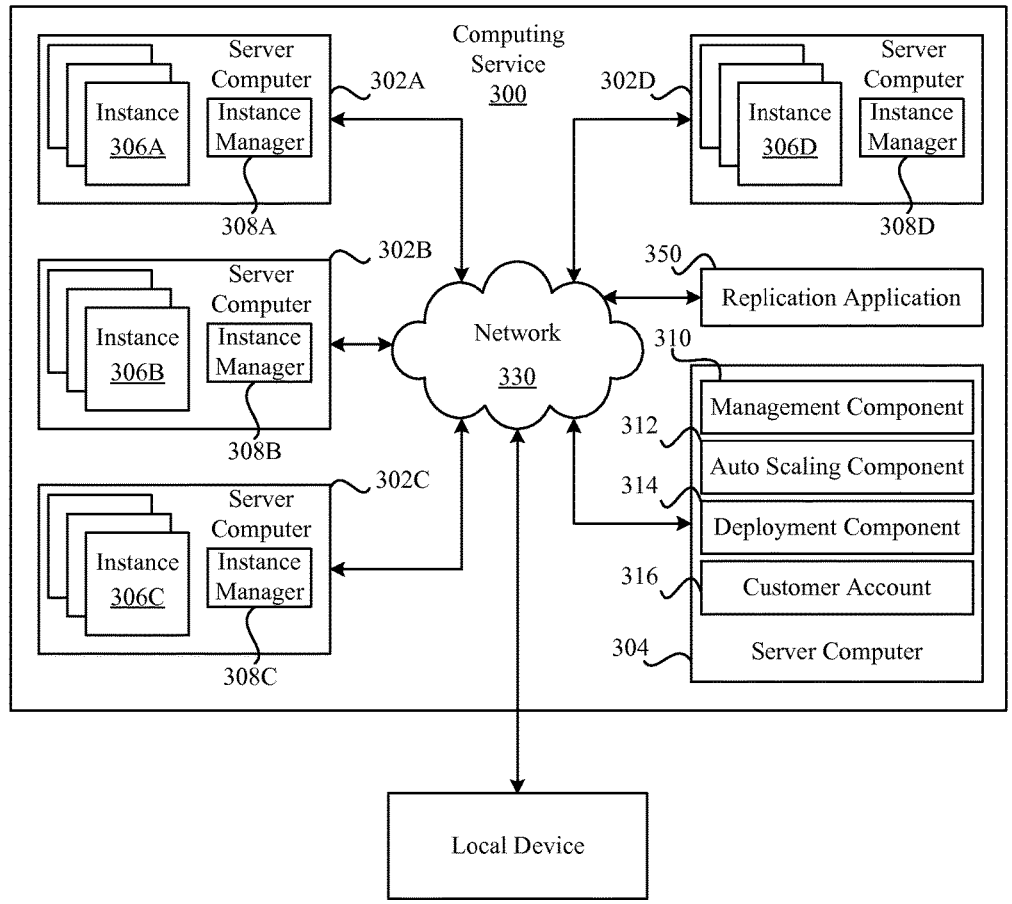
FIG. 3 is a schematic overview of a virtual computing resource provider in accordance with an example of the present technology.

FIG. 3 illustrates how components of a data center may function as a computing service 300 in a service provider environment. As discussed earlier, the computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual computing instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of subcomponents executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 300 may include a replication application 350. The replication application 350 may be configured to provide and/or deploy layout agents, data agents or the like, to create system models and to initiate replication of an infrastructure, such as by spinning up new computing instances, setting configurations or dependencies, and so forth.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
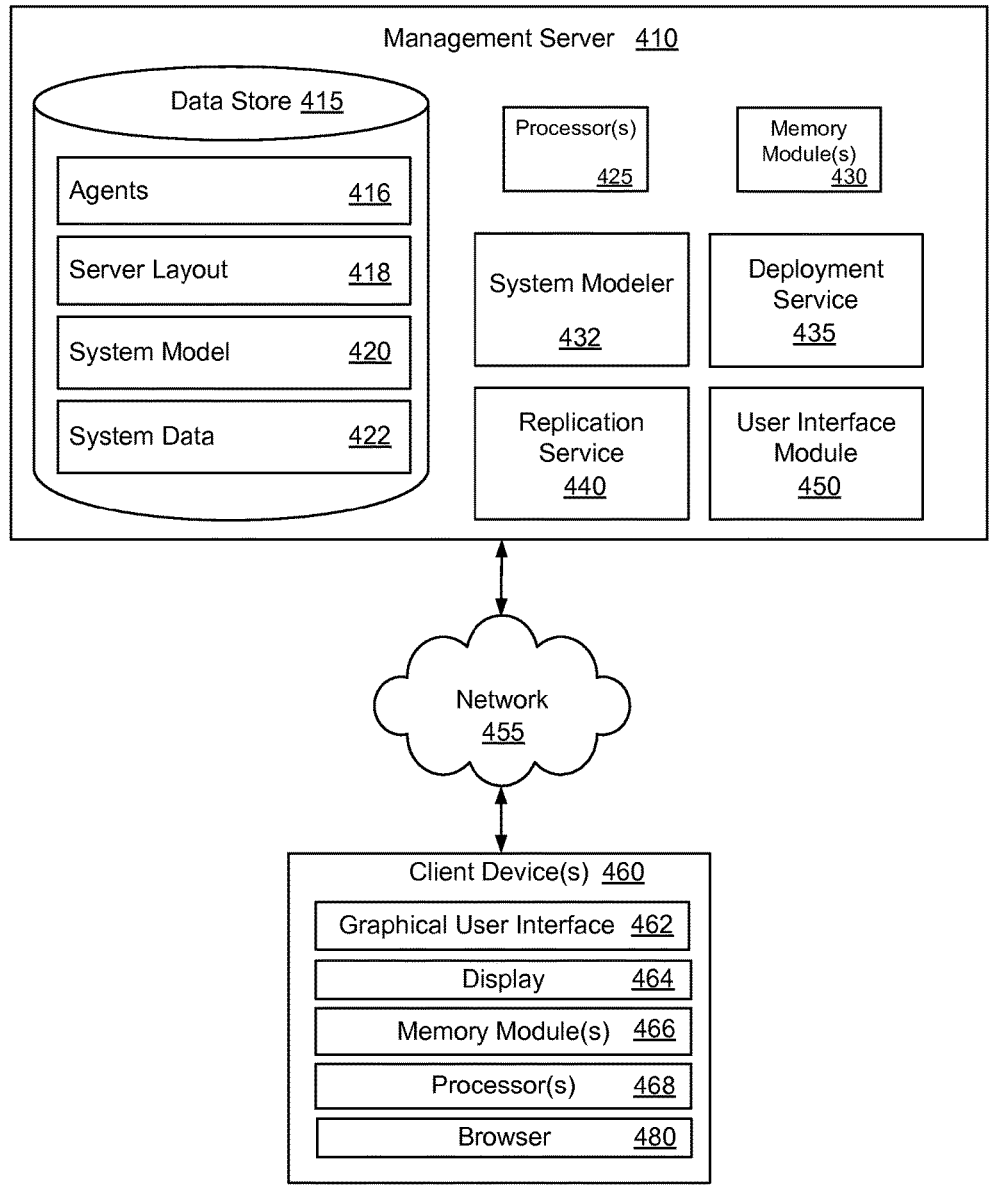
FIG. 4 is a block diagram of a system for capturing a configuration of an infrastructure and initiating replication of the infrastructure in accordance with an example of the present technology.

Referring now to FIG. 4, a block diagram of a system for capturing a configuration of an infrastructure to enable replication of the infrastructure is illustrated in accordance with an example of the present technology. The system may be implemented using one or more computing devices in a service provider environment, such as a management server 410 as an example computing device, as well as client devices 460, and may be implemented across a network 455. The management server 410 may represent the replication application of FIGS. 1-2 or may be a server configured to host a replication application or service configured to perform the functionality described below regarding the management server and/or above in FIGS. 1-2 regarding the replication application. The system may include a data store 415 and a number of modules 432, 435, 440, 450 for storing and processing data to be used in capturing a configuration of an infrastructure.

Computing services offered by a service provider environment, may include a computing device that executes as one or more servers or computing instances. A user may operate one or more servers to execute an operating system and computing applications as a service. A user may create, launch, and terminate servers 410 as desired. The user may have some control over the geographical location of servers or clusters of servers to optimize latency and provide high levels of redundancy.

The user may access and manage the one or more servers over a network connection, such as a connection through the Internet, for example. The user may perform various operations on the servers such as adding, updating, modifying, deleting or other otherwise maintaining software or services on the servers. These operations may be performed by the user from the client device 460.

The server(s) 410 may be a virtual computing instance as previously explained, and the virtual computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisor) may provide a platform on which virtual computing instances may be created. In other words, the virtual computing instances may execute on the hardware layer by using the platform provided by the virtualization layer. This computing service architecture that supports computing instances is illustrated in more detail in FIG. 3.

The system may include one or more data stores 415. The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The data store 415 may include or be configured to store any of a variety of useful types and formats of data. For example, the data store 415 may represent one or more data stores for storing images of agents 416, server layouts 418 (or other types of nodes besides servers, such as networking nodes), system models 420 and system data 422. The agent's data store 416 may be configured to store images of layout agents and data agents for deployment to one or more servers. The layout agents and data agents may be separate and discrete agents with separate distinct purposes and functionality. For example, the agents data store 416 may store an image of a layout agent configured for deployment to a plurality of servers. The layout agent may be configured to capture the server layout data and communicate the server layout data to the server layout data store 418. The server layout data store 418 may be configured to store server layout data for a plurality of servers and may identify the underlying hardware, hardware configurations and hardware dependencies for the plurality of servers, as described earlier.

The agent's data store 416 may store data agents. A data agent may be configured for deployment to the plurality of servers or through another computing service to replicate operational data available to the plurality of servers. The data agent may be configured to monitor changes in the operational data and to replicate the changes in the operational data. In one example, the data agent may be configured to capture snapshots of the data.

A deployment service 435 may be provided. The deployment service 435 may be configured to push the layout agents to each of the plurality of servers. The deployment service 435 may be further configured to push the data agents to the plurality of servers and/or computing services associated with the data stores for storing the operational data.

The layout agents and data agents may report back to the management server 410 with data that is collected. For example, the layout agents may report the collected server layout data and may report when a server layout has been captured. The reported server layout data may be stored in a server layout data store 418. The reported operational data may be stored in the system data store 422. A system modeler 432 may use the server layout data in the server layout data store 418 to generate a system model which may then be stored in the system model data store 420. The system model data store may store a system model for infrastructure comprising the plurality of servers based on the server layout data stored in the server layout data store 418.

A replication service 440 may be configured to re-create or replicate the infrastructure as a replicated infrastructure. The replicated infrastructure may be based on the system model. The infrastructure may be replicated using available hardware corresponding to the underlying hardware for the plurality of servers. The replication service 440 may be further configured to re-create the infrastructure with access to the replicated data, which is illustrated as stored in the system data store 422.

Client devices 460 may access data, content pages, services and so forth via a computing instance or server 410 in a computing service provider environment or one or more computing instances or clusters, over a network 455, and as provided by a user interface module 450. Example client devices 460 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display 464 that may receive and present the message content.

The system may be implemented across one or more computing device(s) connected via a network 455. For example, a computing device may include a data store and various engines and/or modules such as those described above and such modules may be executable by a processor of the computing device. The system may be implemented as a plurality of computing nodes or computing instances, each of which comprises at least one processor 425 and a memory 430, where the computing nodes are configured to collectively implement the modules, data stores and so forth.

The services and modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 460 that may be coupled to the network 455. The client device(s) 460 may communicate with the computing device over any appropriate network, including an intranet, the Internet, a cellular network, a local area network (LAN), a wide area network (WAN), a wireless data network or a similar network or combination of networks.

The client device 460 may include a display 464 for displaying a graphical user interface 462. The display 464 may comprise, for example, one or more devices such as cathode ray tubes (CRTs), liquid crystal display (LCD) screens, gas plasma based flat panel displays, LCD projectors, or other types of display devices, etc. The client device 460 may comprise one or more memory modules 466 and/or processors 468.

The client device 460 may be configured to execute various applications such as a browser 480, a respective page or content access application. The browser 480 may be executed in a client device 460, for example, to access and render content pages, such as web pages or other network content served up by the computing device and/or other servers. The content access application may be executed to obtain and render for display content features from the server or computing device, or other services and/or local storage media.

In some implementations, the content access application may correspond to code that is executed in the browser 480 or plug-ins to the browser 480. In other implementations, the content access application may correspond to a standalone application, such as a mobile application. The client device 460 may be configured to execute applications beyond those mentioned above, such as, for example, mobile applications, email applications, instant message applications and/or other applications. Users at client devices 460 may access content features through content display devices or through content access applications executed in the client devices 460.

The network 455 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
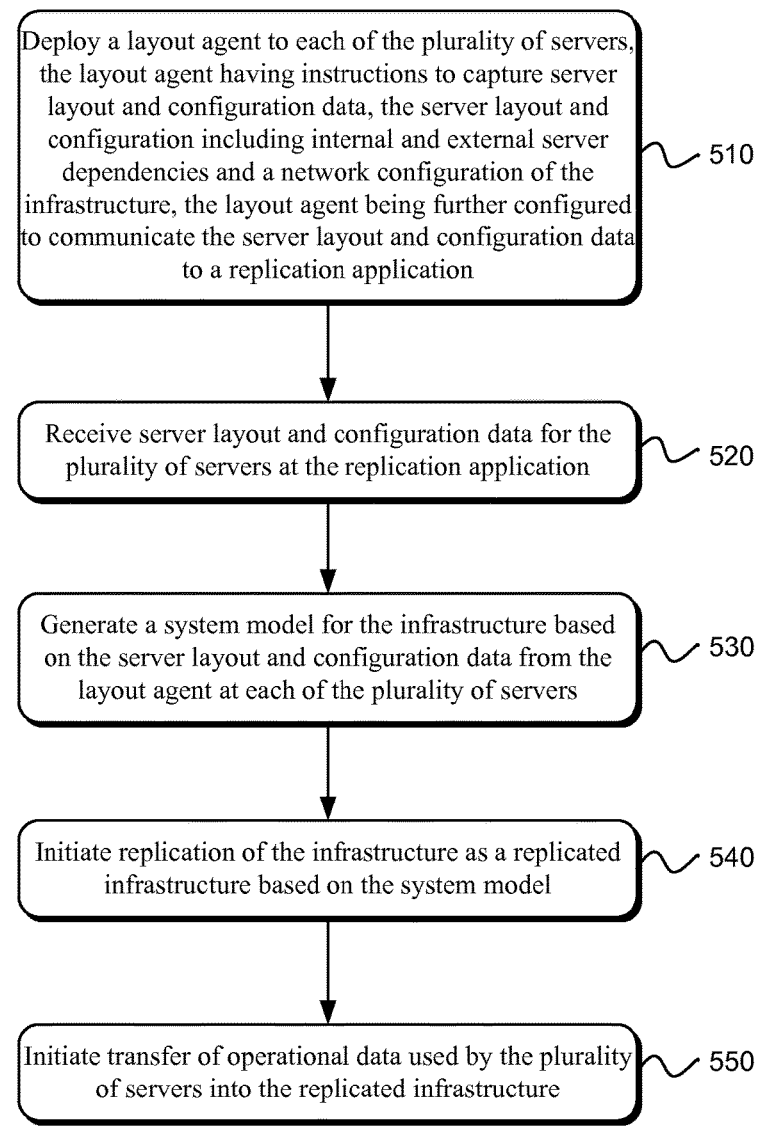
FIGS. 5-6 are flow diagrams for methods of capturing a configuration of an infrastructure in accordance with examples of the present technology.
Figure 6:
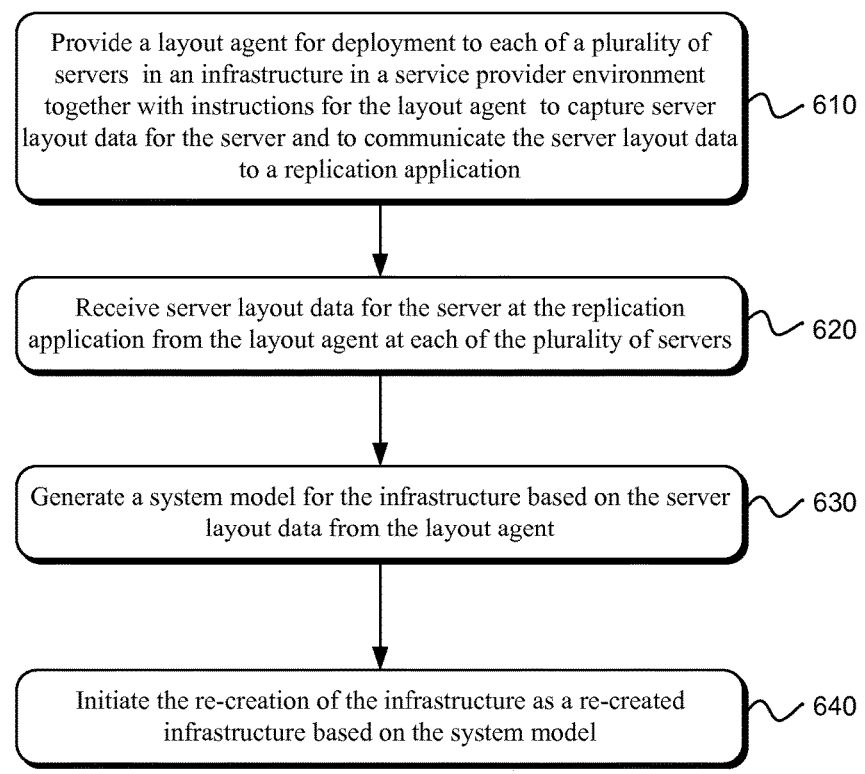

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

In a customer system, such as a system running in a service provider environment, there are typically a large number of loosely coupled or loosely interconnected entities, such as servers, block and object stores, web servers, etc. that are configured in particular ways. Historically, this overall infrastructure has been difficult to replicate because of the numerous dependencies and network relationships. While conventional cloning of an individual virtual machine may result in a copy of that virtual machine, such cloning of an individual machine does not allow for the capture and replication of the overall infrastructure configuration, such as particular IP addresses, or particular entities outside of that server. This technology may provide for the replication of an entire infrastructure including servers and other network elements. Specifically, agents are provided for deployment to the servers to capture the configuration and layout of the servers including the servers internal and external dependencies. The layouts are collected and combined to form a system model usable to replicate the infrastructure in its entirety (e.g., down to IP addresses and other configuration elements).

Referring now to FIG. 5, a flow diagram of a method is illustrated for capturing a configuration of an infrastructure to enable replication of the infrastructure. The infrastructure may be in a service provider environment. A layout agent may be deployed 510 to an infrastructure including a plurality of servers. In other words, a duplicated or common layout agent may be deployed to each of the plurality of servers in the infrastructure. The layout agent may have instructions to capture server layout and configuration data and to communicate the server layout and configuration data to a replication application. For example, server layout and configuration data may include one or more Internet Protocol (IP) addresses of a server, a number of central processing unit (CPU) cores of the server, an amount of memory available to the server, network configurations for the server and data storage accessed by the server, or any of a variety of other types of layout and configuration data for the server. The replication application may receive 520 server layout and configuration data for the plurality of servers in the infrastructure. The replication application may generate 530 a system model for the infrastructure based on the server layout and configuration data from layout agents at the plurality of servers. The infrastructure may be re-created, replicated or re-generated as a re-created infrastructure based on the system model. The re-creation or replication of the infrastructure may be initiated 540 by the replication application. The replication application may also initiate 550 importing or transfer of operational data used by the plurality of servers into the infrastructure.

The method may identify internal and/or external server dependencies (such as hardware dependencies, hardware level bugs (known or unknown) and hardware tied licensing schemes, block storage attached to a server, network Internet Protocol (IP) addresses used in the infrastructure, open server ports, security rules, etc.). At least a portion of the information used for replicating the environment may be obtained using the layout agents. Another portion of the information used for replicating the environment may be repository data available at a control plane in a service provider environment. The repository data may include a network configuration for network management, switching rules, traffic shaping rules, prioritization/de-prioritization rules, packet blocking, etc. The method may include discovery of particular external dependencies (load balancers, firewalls, etc.) and the discovery of external dependencies or configurations may be discovered using the agents and the repository data.

In one example, the replication application may initiate the importation of the operational data by establishing access for the recreated infrastructure to a data store accessed by one or more of the plurality of servers in the infrastructure. In another example, the replication application may be configured to initiate importation of the operational data by copying operational data from a data store accessed by one or more of the plurality of servers in the infrastructure to a re-created infrastructure data store. The replication application may be configured to deploy a data agent to one or more of the plurality of servers to periodically or continuously monitor changes to the operational data and to replicate the changes to the operational data for the re-created infrastructure. The method may include identifying or determining the network configuration.

The method may be implemented in a loosely coupled architecture. In a loosely coupled architecture, components of the architecture may not be specifically aware of what other components are present in the architecture. The method may include identifying components of the architecture. In one example, identifying components of the architecture may be performed programatically. However, in other examples, this identification process may include receiving input from a user (e.g., a system administrator) identifying one or more components of the architecture. For example, the user may identify servers which are present in the architecture and servers to which the layout agents are to be deployed.

In some examples, this or other methods described herein may be implemented wholly or partially as computer readable program code executed by a processor and the computer readable code may be embodied on a non-transitory computer usable medium.

Referring now to FIG. 6, a flow diagram of a method is illustrated for capturing a configuration of an infrastructure to enable replication of the infrastructure. A layout agent may be provided 610 for deployment to an infrastructure, including a server, together with instructions for the layout agent to capture server layout data for the server and to communicate the server layout data to a replication application. The server layout data for the server may be received 620 at the replication application. The server layout data may include, for example, hardware and hardware dependencies that exist for the server. A system model for the infrastructure may be generated 630 based on the server layout data from the layout agent. The re-creation of the infrastructure as a re-created infrastructure may be initiated 640 based on the system model. Also, the replication of operational data used by the server in the infrastructure may be initiated to provide access to the operational data by the servers in the replicated infrastructure.

In one example, a method may include providing the layout agent for manual deployment to the server. Some administrators may wish to manually install or deploy the layout agent at one or more servers in an infrastructure. Some servers may be isolated from the internet or otherwise isolated from a server at which the layout agent is provided. The layout agent may be available for download as an installable or executable file. The layout agent may optionally be an image to be loaded, copied, or burned to a USB drive, memory card, flash memory, logical disk drive, optical disc drive or any other suitable device for receiving the layout agent at a computing device, such as a computing device having access to the internet to download the layout agent, for transferring the layout agent to the desired server in the infrastructure, and for deploying the layout agent to the server through installation, execution, flashing or other methods of deployment.

In one example, a push process may be used to automatically push the layout agent to the server for execution. Servers in the infrastructure may be "visible" to the replication application. An administrator may view the available servers through a graphical user interface for the replication application, including a state of deployment (or lack thereof) of the layout agent for each of the available servers and any other useful information such as a state of server layout and configuration data capture. The administrator may be enabled to select one or more servers to receive the layout agent and the replication application may push the layout agent to the server(s). In other words, the replication application may cause the layout agent to be electronically transmitted to and deployed on the server(s). In one example, the replication application may identify servers in an infrastructure and deploy the layout agent to the servers without interaction by the administrator to identify the servers or initiate the push.

Server layout data for a plurality of servers may be received from a plurality of layout agents at the replication application. The replication application may generate the system model based on the server layout data from plurality of agents. The plurality of agents may be a same agent deployed to multiple different servers. The server layout data may be received from each of the plurality of layout agents independently. For example, the layout agents may directly communicate captured server layout data to the replication application when the captured server layout data is available. The transmission of the server layout data from one layout agent may be asynchronous with server layout data transmitted from another layout agent deployed on a different server. In another example, the server layout data may be collected or aggregated from each of the layout agents prior to transmission to the replication application. A server or data store within or without the infrastructure may be designated for storing the captured server layout data and may aggregate the server layout data from the plurality of layout agents. Once the server layout data is received from each of the layout agents, the aggregated data may be transmitted to the replication application or a notification may be sent to the replication application that the aggregated data is available. Aggregation of the server layout data before transmission may be desirable when, for example, the infrastructure is not accessible via the internet.

A data agent may be provided for deployment to the server together with instructions for the data agent to incrementally synchronize the operational data available to the server. The operational data may be data generated or used by one or more applications executing on the server, for example. In one example, data stores storing the operational data may be cloned using data store snapshots.

The present technology may be used for re-creating the infrastructure as a re-created infrastructure for simultaneous availability of the original infrastructure and the re-created infrastructure. The simultaneous availability may be useful for any number of purposes, some examples of which may include system backup, performance testing, batch testing, debugging, disaster recovery, and so forth.

Figure 7:
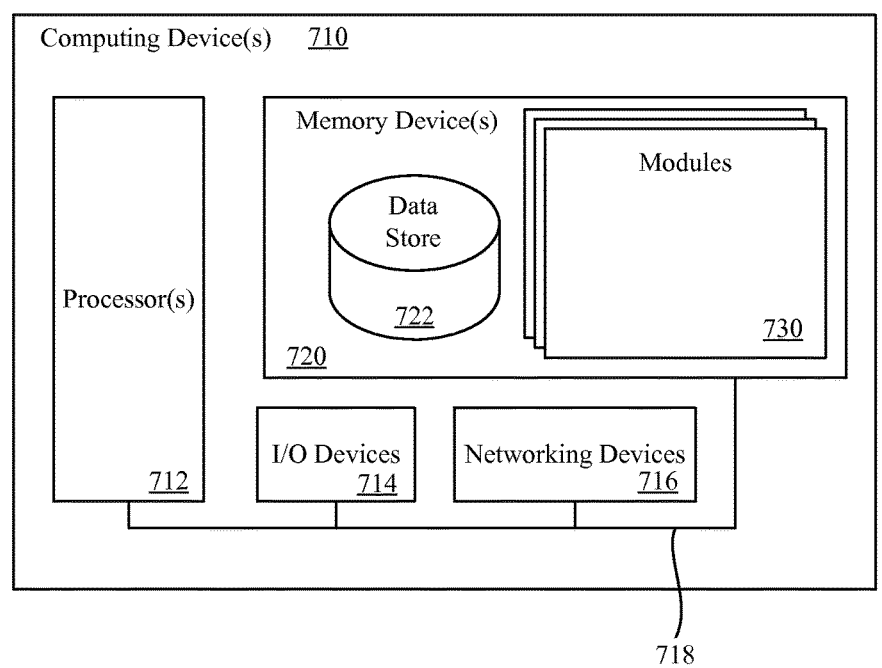
FIG. 7 is a block diagram of a computing system for capturing a configuration of an infrastructure in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712.

For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computing device that is configured to capture a configuration of an infrastructure in a service provider environment to enable replication of the infrastructure, the infrastructure comprising a plurality of servers having internal and external server dependencies, comprising:

a processor; and a memory in electronic communication with the processor;

instructions stored in the memory, the instructions being executable by the processor to:

identify the plurality of servers in the infrastructure;

deploy a layout agent to each of the plurality of servers, the layout agent being an application having instructions to capture server layout and configuration data, the server layout and configuration data including the internal and external server dependencies, the layout agent being further configured to communicate the server layout and configuration data to a replication application;

receive server layout and configuration data for the plurality of servers at the replication application from the layout agent at each of the plurality of servers;

receive, at the replication application, control plane data including the external server dependencies available at a control plane of the service provider environment;

aggregate the server layout and configuration data for the plurality of servers as aggregated data;

generate a system model of the infrastructure based on the aggregated data and a network configuration of the external server dependencies included in the control plane data;
initiate replication of the infrastructure as a replicated infrastructure based on the system model; and
initiate transfer of operational data used by the plurality of servers into the replicated infrastructure.

2. The computing device of claim 1, wherein the server layout and configuration data includes one or more Internet Protocol (IP) addresses of a server, a number of central processing unit (CPU) cores of the server, an amount of memory available to the server, networking configurations for the server and data storage accessed by the server.

3. The computing device of claim 1, further comprising initiating the transfer of the operational data by establishing access for the replicated infrastructure to a data store accessed by one or more of the plurality of servers in the infrastructure.

4. The computing device of claim 1, further configured to initiate copying of the operational data by copying operational data from a data store accessed by one or more of the plurality of servers in the infrastructure to a replicated infrastructure data store.

5. The computing device of claim 1, further configured to deploy a data agent to one or more data stores associated with the plurality of servers to periodically or continuously monitor changes to the operational data and to initiate replication of the changes to the operational data for the replicated infrastructure.

6. A computer-implemented method, comprising:
providing a layout agent for deployment to each of a plurality of servers in an infrastructure in a service provider environment together with instructions for the layout agent to capture server layout data for the server and to communicate the server layout data to a replication application;
receiving server layout data at the replication application from the layout agent at each of the plurality of servers;
aggregating the server layout data for the plurality of servers as aggregated data;
generating a system model of the infrastructure including the plurality of servers based on the aggregated data and external server dependencies received from a control plane of the service provider environment, using a processor; and
initiating replication of the infrastructure as a replicated infrastructure based on the system model, using the processor.

7. The method of claim 6, further comprising providing the layout agent for manual deployment to the server.

8. The method of claim 6, further comprising using a push process to automatically push the layout agent to the server for execution.

9. The method of claim 6, further comprising generating the system model using repository data available at the control plane of the infrastructure, the repository data including at least one of: network management data, switching rules, traffic shaping rules, prioritization/de-prioritization rules, packet blocking, or data associated with a network-related service.

10. The method of claim 6, further comprising initiating replication of operational data used by at least one of the plurality of servers in the infrastructure into the replicated infrastructure.

11. The method of claim 6, further comprising receiving the server layout data at the replication application as an aggregation of server layout data from the plurality of layout agents collectively.

12. The method of claim 6, further comprising providing a data agent for deployment to a data store associated with the server together with instructions for the data agent to incrementally synchronize operational data available to the server.

13. The method of claim 12, further comprising cloning data stores storing the operational data as data store snapshots in preparation for testing changes to the infrastructure on replicated infrastructure.

14. The method of claim 6, wherein the replicated infrastructure includes duplicated hardware and hardware dependencies that exist for the infrastructure.

15. The method of claim 6, further comprising replicating multiple instances of the infrastructure as replicated infrastructures for simultaneous availability for at least two of: system backup, performance testing, batch testing, debugging or disaster recovery.

16. A non-transitory computer-readable medium comprising computer-executable instructions which, when executed by a processor, implement a system, comprising:
a server layout memory configured to store server layout data for a plurality of virtual servers in an infrastructure in a service provider environment, the server layout data including underlying internal and external server dependencies and a network configuration for the plurality of virtual servers;
a layout agent configured for deployment to the plurality of virtual servers and configured to capture the server layout data and communicate the server layout data to the server layout memory;
a system model memory configured to store a system model of the infrastructure comprising the plurality of virtual servers, the system model being based on an aggregation of the server layout data for the plurality of virtual servers stored in the server layout memory and a network configuration of the external server dependencies available at a control plane of the service provider environment; and
a replication service configured to re-create the infrastructure as a replicated infrastructure based on the system model.

17. The computer-readable medium of claim 16, further comprising a deployment service configured to push the layout agent to each of the plurality of virtual servers.

18. The computer-readable medium of claim 16, further comprising a data agent configured for deployment to the plurality of virtual servers to replicate operational data available to the plurality of virtual servers, and wherein the replication service is configured to replicate the infrastructure with access to the replicated operational data.

19. The computer-readable medium of claim 18, wherein the data agent is configured to periodically monitor changes in the operational data and to replicate the changes in the operational data.

20. The computer-readable medium of claim 18, wherein the data agent is configured to continuously monitor changes to the operational data and to initiate replication of the changes to the operational data for the replicated infrastructure.

21. The computer-readable medium of claim 18, the replication service being further configured to re-create the infrastructure as a replicated infrastructure based on the system model using available physical hardware corresponding to underlying physical hardware identified for the virtual servers.

\* \* \* \* \*